(12) United States Patent
Sorin et al.

(10) Patent No.: US 6,909,823 B1
(45) Date of Patent: Jun. 21, 2005

(54) ACOUSTO-OPTIC TUNABLE APPARATUS HAVING A FIBER BRAGG GRATING AND AN OFFSET CORE

(75) Inventors: Wayne V. Sorin, Mountain View, CA (US); B. Yoon Kim, Mountain View, CA (US)

(73) Assignee: Novera Optics, Inc., Palo Alto, CA (US)

( * ) Notice: Subject to any disclaimer, the term of this patent is extended or adjusted under 35 U.S.C. 154(b) by 117 days.

(21) Appl. No.: 10/040,526

(22) Filed: Dec. 28, 2001

(51) Int. Cl.[7] .............................. G02B 6/26; G02B 6/34
(52) U.S. Cl. ............................. 385/28; 385/7; 385/37; 385/10
(58) Field of Search ............................ 385/7, 37, 28, 385/10

(56) References Cited

U.S. PATENT DOCUMENTS

| | | |
|---|---|---|
| 3,916,182 A | 10/1975 | Dabby et al. |
| 4,068,191 A | 1/1978 | Zemon et al. |
| 4,832,437 A | 5/1989 | Kim et al. |
| 4,915,468 A | 4/1990 | Kim et al. |
| 5,007,705 A | 4/1991 | Morey et al. |
| 5,022,732 A | 6/1991 | Engan et al. |
| 5,652,809 A | 7/1997 | Aronson |
| 5,708,736 A * | 1/1998 | Steinblatt ..................... 385/28 |
| 5,982,963 A * | 11/1999 | Feng et al. ..................... 385/37 |
| 6,021,237 A | 2/2000 | Kim et al. |
| 6,151,427 A | 11/2000 | Satorius |
| 6,169,830 B1 | 1/2001 | Kewitsch et al. |
| 6,181,840 B1 * | 1/2001 | Huang et al. ..................... 385/10 |
| 6,233,379 B1 | 5/2001 | Kim et al. |
| 6,253,002 B1 | 6/2001 | Kim et al. |
| 6,266,462 B1 | 7/2001 | Kim et al. |
| 6,343,165 B1 | 1/2002 | Kim et al. |
| 6,430,342 B1 * | 8/2002 | Kim et al. ..................... 385/37 |
| 6,459,834 B1 | 10/2002 | Kim et al. |
| 2002/0021853 A1 * | 2/2002 | Nakazawa et al. ............ 385/7 |
| 2003/0021510 A1 * | 1/2003 | Satorius ......................... 385/7 |

FOREIGN PATENT DOCUMENTS

WO     WO 01/91349 A2     11/2001

OTHER PUBLICATIONS

Midwinter, Optical Fibers for Transmission, 1979, John Wiley & Sons, Chapter 7.*

M.G. Xu, A.T. Alavie, R. Maaskant, and M.JM. Ohn, "Tunable Fibre Bandpass Filter Based on a Linearly Chirped Fibre Bragg Grating for Wavelength Demultiplexing", XP000637908, Electronic Letters, vol. 32, No. 20, pp. 1918–1919 (Sep. 26, 1996).

B.Y. Kim, J. N. Blake, H.E. Engan, and H.J. Shaw, "Acousto–optic frequency–shifting in two–mode opitcal fibers," OFS '86, Tokyo, Japan (Oct. 8–10, 1986).

D. Ostling and H.E. Engan, "Narrow–band acousto–optic tunable filtering in a two–mode fiber," Optics Letters, vol. 20, No. 11, pp. 1247–1249 (Jun. 1, 1995).

T.A. Birks, P.S.J. Russell, and C.N. Pannell, "Low power acousto–optic device based on a tapered single–mode fiber," IEEE Photonics Technology Lett., vol. 6, No. 6, pp. 725–727 (Jun. 1994).

(Continued)

Primary Examiner—John D. Lee
Assistant Examiner—Eric Wong
(74) Attorney, Agent, or Firm—Blakely, Sokoloff, Taylor & Zafman LLP (57) ABSTRACT

A method and apparatus that microbend a fiber Bragg grating with a transverse acoustic wave. The fiber Bragg grating reflects one or more Nth order sidebands of reflection wavelengths an optical signal in order to couple the band of wavelenghts within from a first mode to a second mode.

33 Claims, 6 Drawing Sheets

OTHER PUBLICATIONS

H.S. Kim, et al., "All–fiber acousto–optic tunable notch filter with electronically controllable spectral profile," Optics Letters, vol. 22, No. 19, pp. 1476–1478 (Oct. 1, 1997).

I.K. Hwang, et al., "Long–Period Gratings based on Arch–induced Microbends," OECC '98, Chiba, Japan, pp. 144–145 (Jul. 12–16, 1998).

B.Y. Kim, et al., "Fiber Based Acousto–Optic Filters," OFC/IOOC '99, San Diego, California, USA, pp. 199–201, Invited Paper (Feb. 21–26, 1999).

B.Y. Kim, "Acousto–Optic Components for WDM Applications," IEEE/LEOS Summer Topical Meetings, San Diego, California, USA, pp. 47–48, Invited Papers (Jul. 26–28, 1999).

T.A. Birks, et al., "The acousto–optic effect in single–mode fiber tapers and couplers," Journal of Lightwave Technology, vol. 14, No. 11, pp. 2519–2529 (Nov. 1996).

D.W. Huang, et al., "Reflectivity–tunable fiber Bragg grating reflectors," IEEE Photonics Technology Letters, vol. 12, No. 2, pp. 176–178 (Feb. 2000).

W.F. Liu, et al., "100% efficient narrow–band acoustooptic tunable reflector using fiber Bragg grating," Journal of Lightwave Technology, vol. 16, No. 11, pp. 2006–2009 (Nov. 1998).

D.W. Huang, et al., "Q–Switched all–fiber laser with an acoustically modulated fiber attenuator," IEEE Photonics Technology Letters, vol. 12, No. 9, pp. 1153–1155 (Sep. 2000).

PCT/US 02/41211, International Search Report, International Filing Date Dec. 20, 2002, pp. 3 pgs total.

Wen–Fung Liu et al., "Acoustic–induced switching of the reflection wavelength in a fiber Bragg grating", 2000 Optical Society of America, Optics Letters, vol. 25, No. 18, Sep. 15, 2000, pp. 1319–1321.

Ding–Wei Huang et al., "Reflectivity–Tunable Fiber Bragg Grating Reflectors", 2000 IEEE, IEEE Photonics Technology Letters, vol. 12, No. 2, Feb. 2000, pp. 176–178.

W.F. Liu et al., "100% Efficient Narrow–Band Acoustooptic Tunable Reflector Using Fiber Bragg Grating", 1998 IEEE, Journal of Lightwave Technology, vol. 16, No. 11, Nov. 1998, pp. 2006–2009.

W.F. Liu et al., "Acousto–optic superlattice modular using a fiber Bragg grating", 1997 Optical Society of America, Optics Letters, vol. 22, No. 19, Oct. 1, 1997, pp. 1515–1517.

Seok Hyun Yun et al., "All–fiber tunable filter and laser based on two–mode fiber", 1996 Optical Society of America, Optics Letters, vol. 21, No. 1, Jan. 1, 1996, pp. 27–29.

* cited by examiner

ACOUSTO-OPTIC TUNABLE APPARATUS HAVING A FIBER BRAGG GRATING AND AN OFFSET CORE

FIELD OF THE INVENTION

This invention generally relates to performing one or more operations on a band of wavelengths within an optical signal. More particularly, an aspect of this invention relates to acousto-optic sideband generating technologies.

BACKGROUND OF THE INVENTION

Multiple channels of optical information may be carried within a single optical signal similar to multiple channels of television being transmitted to a consumer's home through a single cable TV signal. The multiple signals within the optical signal may be broadcast through a technique called dense wavelength division multiplexing which interweaves all the channels into a single photo optic signal. The International Telecommunications Union established a frequency grid spacing of one hundred GigaHertz (i.e. about eight tenths of a nanometer between adjacent channels of optical information). For example, five adjacent optical channels may be optical wavelengths of 1550.12 nanometers (nm), 1549.32 nm, 1548.51 nm. 1547.72 nm, and 1546.92 nm. Thus, bandwidth of each channel is confined to a very narrow band of wavelengths, such as 1549.12 nm to 1549.52 nm (1549.32 nm+/−0.2 nm) in order to prevent a fist channel overlapping into an adjacent channel and distorting the information in both channels.

Acousto-optic technologies may use an acoustic wave to manipulate a photo optic signal traveling through an optical fiber. The acoustic wave may be used to manipulate a narrow band of wavelengths within the photo optic signal.

Several related acousto-optic sideband generating technologies have disadvantages that make those technologies commercially impractical. A first acousto-optic sideband generating technology and a second acousto-optic sideband generating technology generate longitudinal acoustic waves that induce accordion like ripples on a reduced diameter optical fiber containing a fiber Bragg grating. The optical fiber has a core that contains a fiber Bragg grating and a cladding that surrounds the core positioned in the center of the cladding. The diameter of the optical fiber is reduced to magnify the acoustic waves effect of vibrating the periodic gratings inscribed in the fiber Bragg grating. The vibrating fiber Bragg grating may be tuned to manipulate a particular band of wavelengths within the photo optic signal. In these technologies, without a reduced diameter optical fiber, a stronger amplitude acoustic wave is needed to achieve the desired tuning of the periodic gratings. If the vibration from the acoustic wave becomes too strong, then damage may occur to the optical fiber, especially where the optical fiber is being clamped in place.

SUMMARY OF THE INVENTION

Various methods and apparatuses are discussed that microbend a fiber Bragg grating with a acoustic wave. The interaction between the acoustic wave and the fiber Bragg grating reflects one or more Nth order sidebands of reflection wavelengths an optical signal in order to couple the band of wavelengths within from a first mode to a second mode. In an embodiment, an optical waveguide has an interaction region containing the fiber Bragg grating, a cladding, and a core offset in respect to the cladding.

Other features and advantages of the present invention will be apparent from the accompanying drawings and from the detailed description that follows below.

BRIEF DESCRIPTION OF THE DRAWINGS

The present invention is illustrated by example and not limitation in the figures of the accompanying drawings, in which like references indicate similar elements and in which.

DETAILED DESCRIPTION

In general, apparatuses, methods, and systems are described in which an acoustic wave exciter affixes to an optical waveguide that has an interaction region containing a fiber Bragg grating, a cladding, and a core offset in respect to the cladding. In an embodiment, the acoustic wave exciter transmits a transverse acoustic wave along the interaction region in order to operate upon an optical signal passing through the interaction region by microbending the fiber Bragg grating. For one embodiment, the acoustic wave may extract a band of wavelengths from the optical signal, eliminate the band of wavelengths from the optical signal, add a band of wavelengths to the optical signal, or perform another similar operation upon the optical signal.

Figure 1A:
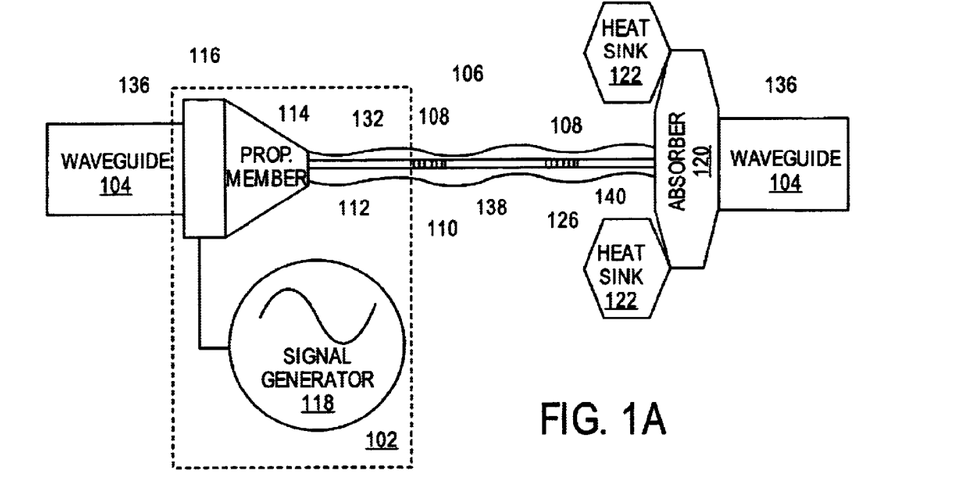
FIG. 1a is a block diagram of an embodiment of an acoustic wave exciter affixed to an optical waveguide that contains an interaction region, one or more fiber Bragg gratings, a cladding, and a core offset in respect to the cladding.

FIG. 1a is a block diagram of an embodiment of an acoustic wave exciter affixed to an optical waveguide that contains an interaction region, one or more fiber Bragg gratings, a cladding, and a core offset in respect to the cladding. For one embodiment, the acoustic wave exciter 102 may comprise of a amplifying member 114 such as a horn, an acoustic wave generator 116 such as a transducer, and a signal generator 118 such as an RF signal generator. The optical waveguide 104, such as an optical fiber, may include an interaction region 106 containing one or more fiber Bragg gratings 108, a cladding 110 and a core 112 offset in respect to the cladding 110. Further, one or more acoustic wave absorbers 120 may connect to the interaction region 106 at each end of the interaction region 106. Likewise, one or more heat sinks 122 may connect to each acoustic wave absorber 120. For one embodiment, the core 112 contains one or more fiber Bragg gratings 108. For an alternative embodiment, the cladding 110 contains one or more fiber Bragg gratings 108.

For one embodiment, the acoustic wave exciter 102 generates an acoustic wave to be transmitted to the interaction region 106. The signal generator 118 applies an RF signal to the acoustic wave generator 116 in order to induce the amplifying member 114 to propagate the acoustic wave. For one embodiment, the acoustic wave exciter 102 generates the acoustic wave at a first frequency that corresponds to a first order sideband of optical wavelengths 124 from each fiber Bragg grating 108. The amplifying member 114 amplifies and transmits the acoustic wave to vibrate the interaction region 106. For one embodiment, the acoustic wave is a transverse acoustic wave. For one embodiment, the acoustic wave is a longitudinal, torsional or any other type of acoustic wave. The transmitted acoustic wave effects the fiber Bragg grating 108 by increasing and decreasing the spacing, via straining and compression, of the periodic gratings 126 inscribed in the fiber Bragg grating 108.

Figure 1B:
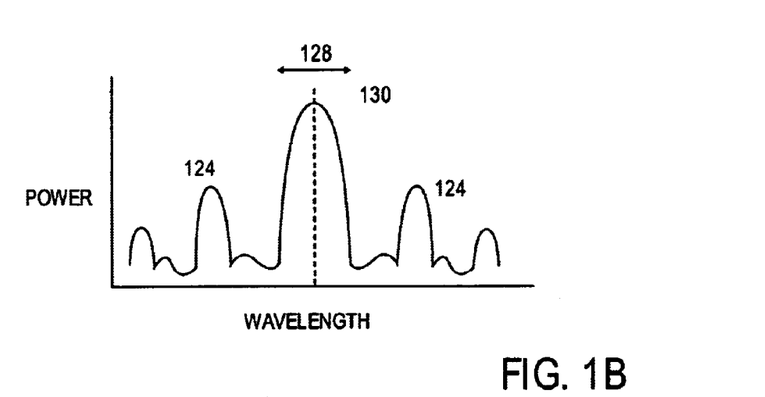
FIG. 1b is an graph of an exemplary main Bragg band of wavelengths and Nth order sidebands of optical wavelengths reflected by the vibrated fiber Bragg gratings.

FIG. 1b is a graph of an exemplary main Bragg band of reflected wavelengths and Nth order sidebands of optical wavelengths reflected by the vibrated fiber Bragg gratings. The fiber Bragg gratings in a nominal static state reflect a main Bragg band of wavelengths 128 from an optical signal passing through the fiber Bragg grating. The center wavelength 130 of the main Bragg band of wavelengths 128 corresponds to the nominal spacing of the periodic gratings inscribed in the fiber Bragg grating. The swift increasing and decreasing of spacing between the periodic gratings causes the first order sideband of optical wavelengths 124 to be reflected in addition to the main Bragg band of wavelengths 128 being reflected. The acoustic wave interaction with the fiber Bragg grating causes the input signal to couple from a first mode to a second mode. For one embodiment, coupling means transitioning energy from one spatial propagation mode to another spatial propagation mode.

Figure 1C:
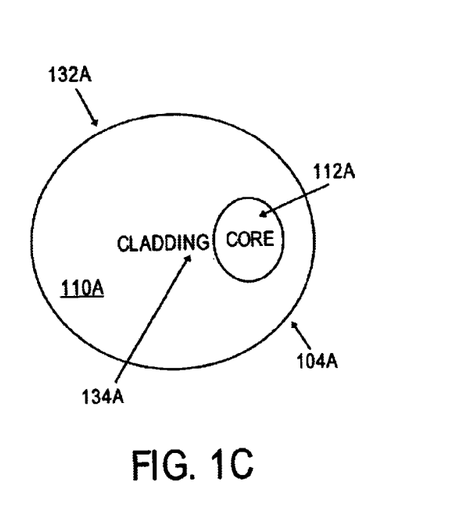
FIGS. 1c, 1d, and 1e are cross-sectional views of various embodiments of the optical waveguide having an offset core with respect to the cladding.
Figure 1D:
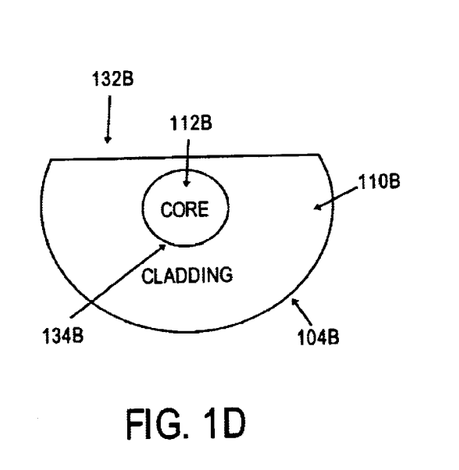
Figure 1E:
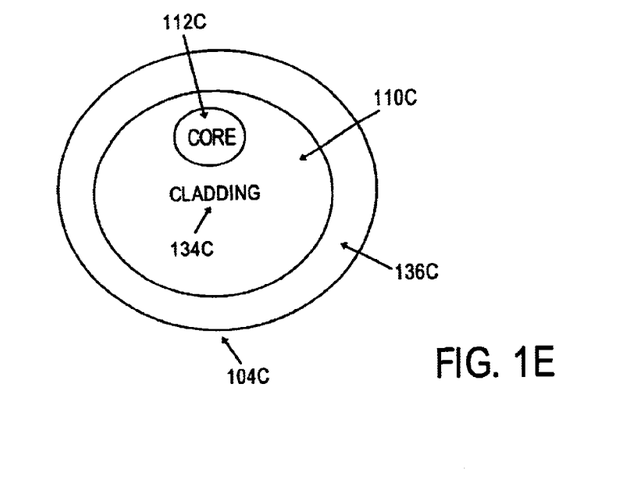

FIGS. 1c, 1d, and 1e are cross-sectional views of various embodiments of the optical waveguide having an offset core with respect to the cladding. Referring to figure 1c, a first embodiment of the optical waveguide 104a has an elliptical shaped cladding 110a and a core 112a centered in a first lobe portion of the elliptical shaped cladding 110a. The elliptical shaped cladding 110a has an outer surface 132a. The core 112a being located closer to the outer surface 132a of the cladding 110a than if the core 112a was centered 134a in the cladding 110a.

Referring to FIG. 1a, for one embodiment, the core 112 may be offset with respect to the cladding 110 to magnify the compression and straining of the fiber Bragg gratings 108 induced by the transmission of the acoustic wave along the interaction region 106. The compression and straining effects from a transverse acoustic wave on the fiber Bragg gratings 108 is magnified by having the core location offset from the center of the cladding. Thus, a smaller amplitude acoustic wave may effect a less violent shaking of the interaction region 106 to achieve a desired straining and compression of the periodic gratings 126 in the fiber Bragg grating 108. For one embodiment, the interaction region 106 is reduced in diameter. For one embodiment, the interaction region 106 is nominal size in diameter.

Referring to FIG. 1d, a second embodiment of the optical waveguide 104b has a D-shaped cladding 110b and a core 112b near the surface in the D-shaped cladding 110b. After the optical waveguide 104b is manufactured a top lobe of the elliptical cladding 110b is removed in order to position the core 112b closer to the outer surface 132b. Thus, the position of the core 112b is closer to the outer surface 132b of the cladding 110b and offset in respect to the center 134b of the remaining cladding 110b.

Referring to FIG. 1e, a third embodiment of the optical waveguide 104c has a circular shaped cladding 110c, a core 112c offset from the center of the circular shaped cladding 134c, and optionally a structural protective casing 136c such as a jacket.

Referring to FIG. 1a, the interaction region 106 in the optical waveguide 104 is where the structural protective casing 136 is removed. For one embodiment, the optical waveguide 104 may be manufactured without a structural protective casing 136 and the interaction region 106 is positioned between the acoustic transducer and acoustic wave absorber 120. The absence of the structural protective casing 136 prevents absorption of the acoustic wave traveling along the interaction region. A section of the cladding 110 in the interaction region 106 may be tapered to further magnify the microbend effects on the fiber Bragg gratings 108 caused by the vibration of the acoustic wave.

For one embodiment, the one or more fiber Bragg gratings 108 may consist of two or more portions. For one embodiment, the first portion 138 is discrete from the second portion 140 and an interruption of the fiber Bragg grating 108 exists between the second potion 140 and the first portion 138. For one embodiment, the fiber Bragg grating 108 is continuous from the first portion 140 to the second portion 138 (not illustrated).

Figure 2A:
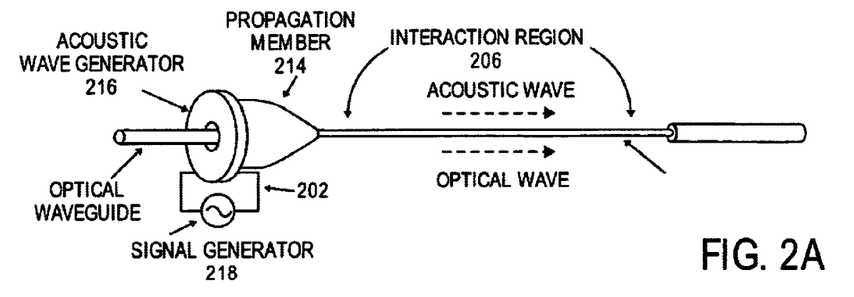
FIG. 2a is a block diagram of the acoustic wave exciter transmitting an acoustic wave at a first frequency and at a first amplitude to the interaction region.

FIG. 2a is a block diagram of an embodiment of the acoustic wave exciter transmitting an acoustic wave at a first frequency and at a first amplitude to the interaction region. As noted in FIG. 1, an embodiment of the acoustic wave exciter 202 may include a signal generator 218, an acoustic wave generator 216, and an amplifying member 214. The signal generator 218 can vary both the amplitude and the frequency of the RF signal applied to the acoustic wave generator 216. The acoustic wave generator 216 transmits the acoustic wave along the interaction region 208.

Figure 2B:
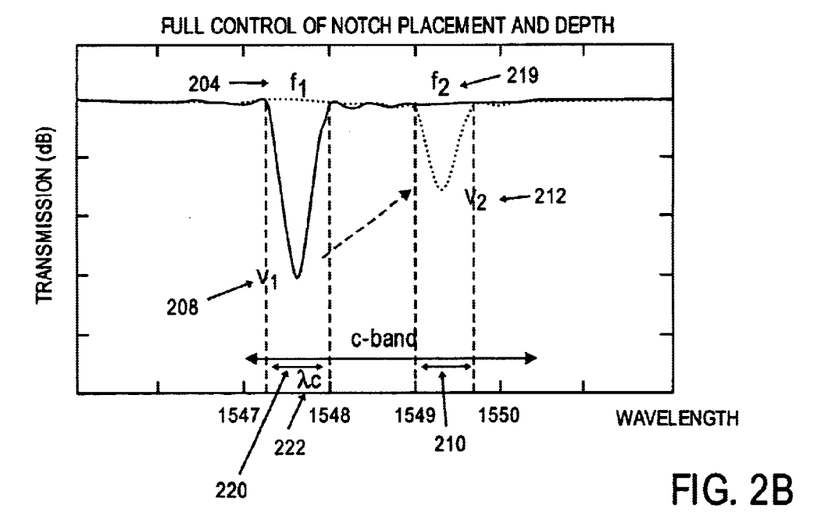
FIG. 2b is a graph of an exemplary transmission through the acousto-optic device.

FIG. 2b is a graph of an exemplary transmission through the acousto-optic device. The acoustic wave is generated at a given frequency and at a given signal strength such as a first frequency 204 and at a first amplitude 208. Due to the microbending of the fiber Bragg grating, the vibrated fiber Bragg grating generates the first order sidebands of reflected wavelengths. A mathematical relationship exists between the frequency of the generated acoustic wave, such as the first frequency 204, and the coupled center wavelength (λc) 222 of the Nth order sidebands of the optical signal.

An incoming optical signal may contain multiple channels of optical information. Each channel may be a narrowly defined band of wavelengths within the optical signal. As noted above, a spacing of about eight tenths of a nanometer exists between adjacent channels of optical information on the International Telecommunications Union frequency grid.

Each channel corresponding to a particular center optical wavelength. For example, five adjacent optical channels may have center optical wavelengths of 1550.12 nanometers (nm), 1549.32 nm, 1548.51 nm 1547.72 nm, and 1546.92 nm. Thus, bandwidth of each channel is confined to a very narrow band of wavelengths, such as 1549.12 nm to 1549.52 nm (1549.32 nm+/−0.2 nm). The optical signal passing through the one or more fiber Bragg gratings may contain, for example, forty channels of optical information.

The signal generator controls the frequency and amplitude of the acoustic wave in order to operate upon one or more of the individual channels within the optical signal passing through the interaction region 206 without affecting the remaining channels. The first frequency 204 determines which first order sideband center wavelength is reflected. For example, the first frequency 204 could correspond to microbending the fiber Bragg grating to reflect a narrow first order sideband of reflected wavelengths centered on 1547.72 nm. The magnitude of the first amplitude 208 determines the percentage of the narrow band of wavelengths centered on 1547.72 nm coupled from a first mode, such as a forward traveling core mode, to a second mode, such as a backward traveling core mode or cladding mode. The periodic spacings of the fiber Bragg gratings determines the center of the band of wavelengths reflected such as center wavelength ($\lambda c$) 222. The number of periodic gratings in the fiber Bragg gratings determines the width of the band of wavelengths reflected such as a first band 220 of wavelengths within the optical signal. Likewise the signal generator 218 may generate a second frequency 219 at a second amplitude 212 to manipulate a second band 210 of wavelengths within the optical signal. For example, the second frequency 219 could correspond to microbending the fiber Bragg grating to reflect a narrow first order sideband of wavelengths centered on 1549.32 nm.

Figure 3A:
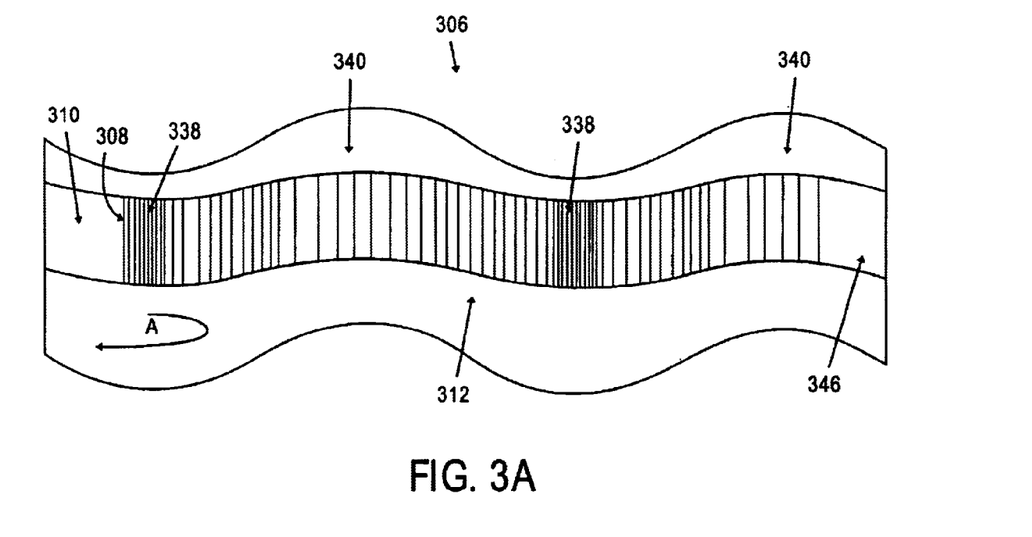
FIG. 3a is a magnified view of an embodiment of the interaction region from FIG. 1 and illustrates the effects of an embodiment of acoustic wave on the interaction region containing one or more fiber Bragg gratings and an offset core with respect to the cladding.

FIG. 3a is a magnified view of an embodiment of the interaction region from FIG. 1 and illustrates the effects of an embodiment of acoustic wave on the interaction region containing one or more fiber Bragg gratings and an offset core with respect to the cladding. For one embodiment, the interaction region 306 contains cladding 312 and a core 310 offset in respect to the center of the cladding 312. The interaction region 306 also contains one or more fiber Bragg gratings 308. For one embodiment, each fiber Bragg grating 308 is continuous from the first potion 338 to the second portion 340.

For one embodiment, when the acoustic wave flexes the interaction region downward the first portion 338 of the periodic gratings in the fiber Bragg grating 308 compress to decrease the spacing between each grating. When the acoustic wave flexes the interaction region 306 upward the second portion 340 of the periodic gratings in the fiber Bragg grating 308 strains to increase the spacing between each grating. The cyclic stretching and compressing of the space between the gratings causes the first order sideband of wavelengths to be reflected.

Figure 3B:
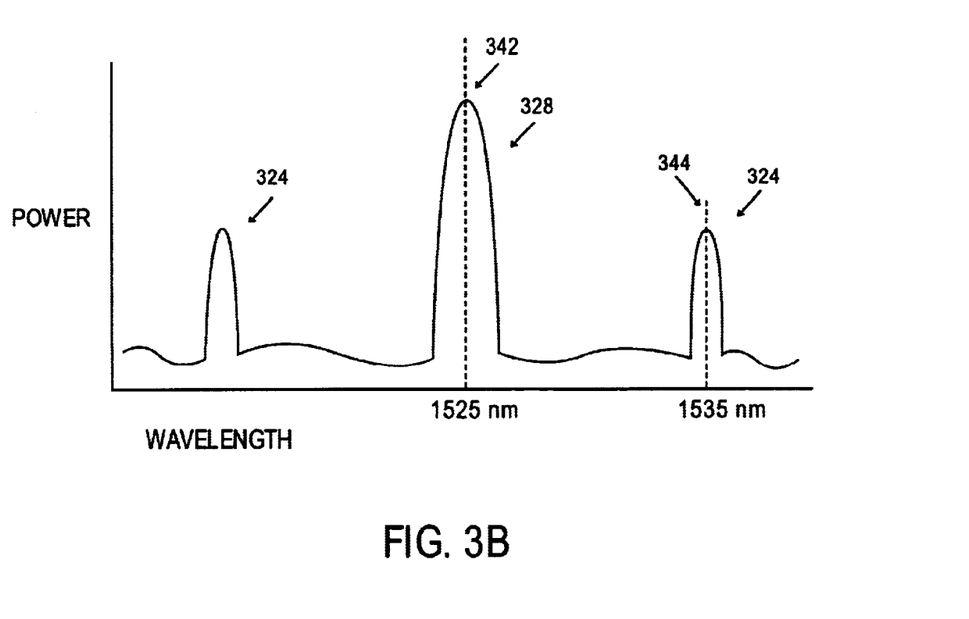
FIG. 3b is a graph of an exemplary main Bragg wavelength and two first order sidebands reflected by the fiber Bragg grating.

FIG. 3b is a graph of an exemplary main Bragg wavelength and two first order sidebands reflected by the fiber Bragg grating. The graph illustrates a main Bragg wavelength 328 having a center wavelength of 1525 nm 342 and two first order sidebands 324. One of the first order sidebands 324 has a center wavelength of 1535 nm 344. As noted, the acoustic wave frequency and amplitude controls the spectral location and intensity of the first order sideband of reflected wavelengths 324, respectively. For one embodiment, the first order sideband of reflected wavelengths 324 are spectrally located on both sides of the main Bragg band of reflected wavelengths 328.

The main Bragg band of reflected wavelengths 328 may have a center wavelength of 1525 nm 342 and the first order sideband of reflected wavelengths 324 may have a center wavelength 344 spectrally located 10 nm displaced away from the main Bragg wavelength 342. For one embodiment, the spectral location of the first order sideband reflected wavelengths is based upon the acoustic wave frequency, the phase index of the optical waveguide, and the center wavelength of the fiber Bragg grating. For one embodiment, each first order sideband of reflected wavelengths 324 is equally displaced from the main Bragg wavelength 342 due to the frequency of the acoustic wave. The overall spectral shape and center wavelength of the main Bragg band of reflected wavelengths 328 corresponds to the nominal spacing and strength of the periodic gratings inscribed in the fiber Bragg grating.

For one embodiment, the strength of first order sidebands of wavelengths 324 follows a Bessel function similar to the case for frequency modulation of a sinusoidal wave. The index of refraction changes for the mode that the optical signal is propagating through due to the microbending effects on the fiber Bragg grating. The changed index of refraction may cause the coupling between modes.

The simultaneous increasing and decreasing of spacing between the periodic gratings of the fiber Bragg grating 308 causes the first order sideband of reflected wavelengths 324 to be reflected in addition to the main Bragg band of reflected wavelengths 328. For one embodiment, the spectral shape of the first order sideband of reflected wavelengths 324 replicate the spectral shape of the main Bragg band of reflected wavelengths 328.

Referring to FIGS. 3a and 3b, the acoustic wave induced vibration and hence microbending of the fiber Bragg grating 308 causes coupling between a first mode such as a forward propagation core mode, and a second mode such as a counter propagating cladding mode. For one embodiment, if the striations of the gratings are perpendicular to the incoming optical signal then the reflected wavelengths within the optical signal may be coupled from the forward propagation core mode to the counter propagation core mode. For one embodiment, if the striations of the gratings are not perpendicular to the incoming optical signal then the reflected wavelengths within the optical signal may be coupled from the forward propagation core mode to the counter propagation cladding mode. For one embodiment, if the striations of the gratings are not perpendicular to the incoming optical signal then the reflected wavelengths within the optical signal may be coupled from the forward propagation core mode to a backward propagating cladding mode. Thus, the incoming optical signal may be separated into a forward optical signal propagating past the fiber Bragg grating 308 and a reflected optical signal reflected from the fiber Bragg grating 308. The forward optical signal may be collected at the output 346 of the interaction region and routed to another optical component. Similarly, the reflected optical signal may be collected and routed to another optical component.

Figure 4A:
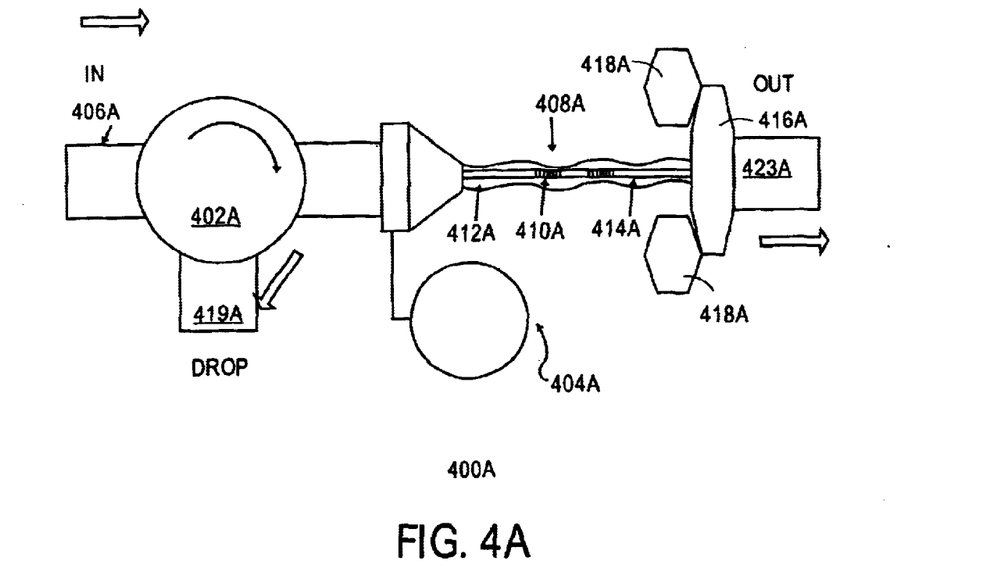
FIG. 4a and FIG. 4b are block diagrams of embodiments of optical add/drop modules using acoustically induced coupling of wavelengths within an optical signal from a first mode to a second mode to add or drop bands of wavelengths from the optical signal.
Figure 4B:
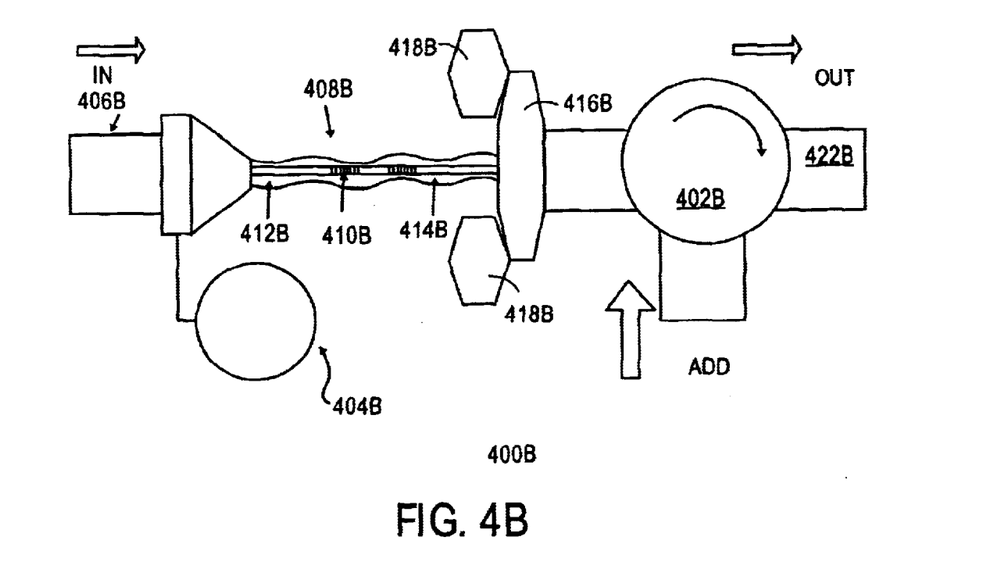

FIG. 4a and FIG. 4b are block diagrams of embodiments of optical add/drop modules using acoustically induced coupling of wavelengths within an optical signal from a first mode to a second mode to add or drop bands of wavelengths from the optical signal.

Referring to FIG. 4a, for one embodiment, a drop module 400a consists of a circulator 402a, an acoustic wave exciter 404a, an optical waveguide 406 having an interaction region 408a containing a fiber Bragg grating 410a, a cladding 412a, and a core 414a offset in respect to the cladding 412a, an acoustic wave absorber 416a, and a heat sink 418a.

For one embodiment, the incoming optical signal contains multiple optical channels of wavelengths. For example, the incoming signal may contain forty channels included within the spectrum of 1532.0 nm to 1562.0 nm. The circulator 402a routes the incoming optical signal in the forward direction to the interaction region 408a. The main Bragg wavelength may be set to a center wavelength outside the spectrum of the optical signal such as 1528 nm. Thus, the main Bragg band of reflected wavelengths will not affect the optical signal. The vibrated fiber Bragg grating 410a also reflects the first order sideband of reflected wavelengths that can be spectrally located within the spectrum of the optical signal. As noted above, the frequency of the acoustic wave determines the center wavelength of the first order sideband. Thus, a band of wavelengths corresponding to a single channel may be reflected out of the optical signal to leave the remaining optical channels, thirty-nine in this example, propagating through the output 422a of the drop module 400a. Also, a single channel reflects back, for example, in a counter propagational core mode toward the circulator 402a. The circulator 402a may route the reflected signal to drop output 419a from the circulator 402a. Similarly in an embodiment, the band of wavelengths corresponding to the single channel may be coupled into a cladding mode by microbending the fiber Bragg grating.

Referring to FIG. 4b, for one embodiment, an add module 400b consists of a circulator 402b, an acoustic wave exciter 404b, an optical waveguide 406b having an interaction region 408b containing a fiber Bragg grating 410b, a cladding 412b, and a core 414b offset in respect to the cladding 412b, an acoustic wave absorber 416b, and a heat sink 418b.

For one embodiment, the incoming optical signal contains multiple optical channels of wavelengths. For example, the incoming signal may contain thirty-nine channels contained within the spectrum of 1530 nm to 1562 nm and missing the 1550 nm optical channel. The incoming optical signal propagates in a forward direction into the interaction region 408b. A circulator 402b receives an optical signal that adds the missing 1550 nm optical channel. The circulator 402b may route the 1550 nm optical channel into the interaction region 408b. The acoustic wave exciter 404b adjusts the frequency of the acoustic wave to cause the fiber Bragg grating 410b to reflect the first order sideband, the 1550 nm optical channel. The 1550 nm optical channel propagates with the other thirty-nine channels through the circulator 402b to the output 422b of the circulator 402b. For one embodiment, using mode coupling as the means to manipulate the optical signal the insertion loss on the optical signal passing through the interaction region 404b is very low.

For one embodiment, the optical signal can travel in multiple modes such as forward propagating core to counter propagating core, core to cladding, polarization to polarization, multiple cladding modes to a single core mode, and other similar optical modes.

Figure 5A:
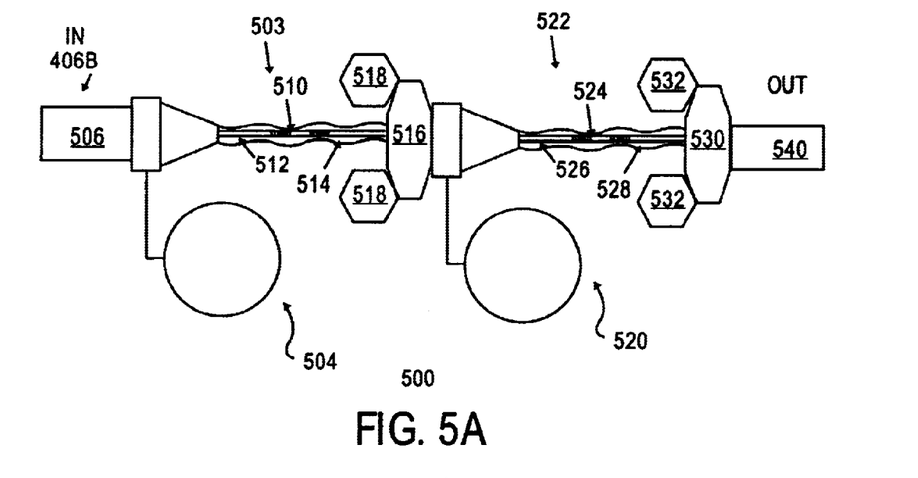
FIG. 5a is an embodiment of a gain-flattening module using acoustically induced microbending of a fiber Bragg grating to couple a portion of a band of wavelenghts from a first mode to a second mode.

FIG. 5a is an embodiment of a gain-flattening module using acoustically induced microbending of a fiber Bragg grating to couple a portion of a band of wavelengths from a first mode to a second mode.

For one embodiment, a gain flattening module 500 consists of a first acoustic wave exciter 504, an optical waveguide 506 having a first interaction region 508 containing a first fiber Bragg grating 510, a first cladding 512, and a first core 514 offset in respect to the first cladding 512, a first acoustic wave absorber 516, and a first heat sink 518. The gain flatting module also has a second acoustic wave exciter 520, a second interaction region 522 containing a second fiber Bragg grating 524, a second cladding 526, and a second core 528 offset in respect to the second cladding 526, a second acoustic wave absorber 530, and a second heat sink 532.

For one embodiment, the percentage of the first order sideband of wavelengths reflected from a first mode to a second mode is based upon the amplitude of acoustic wave, the proximity of the fiber Bragg gratings to the outer surface of the optical waveguide, the coupling constant of the fiber Bragg grating for that mode, and the phase index of the optical waveguide. Thus, all or just a portion of the reflected wavelengths within the optical signal may be removed from the optical signal.

Figure 5B:
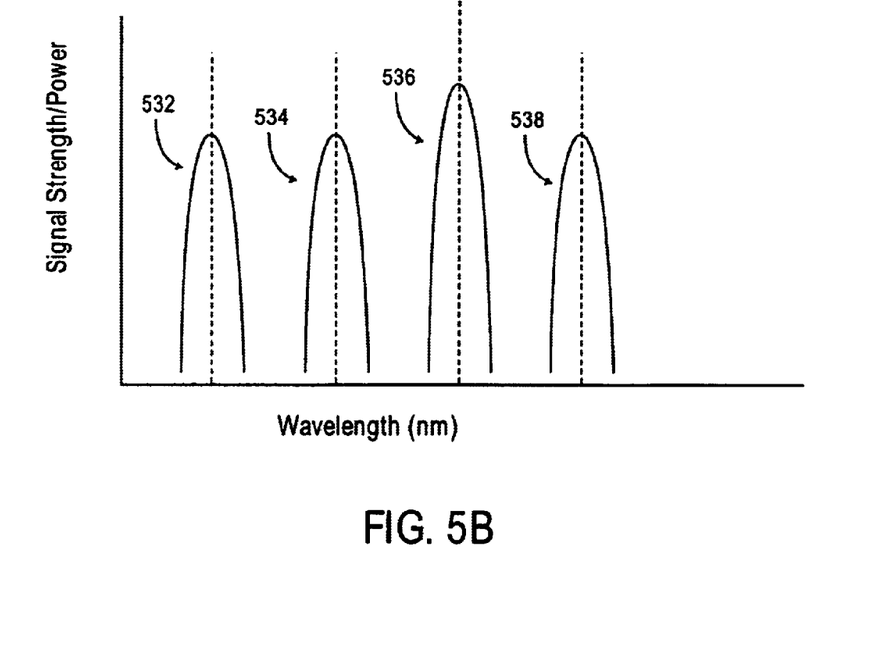
FIG. 5b is a graph of four exemplary bands of wavelength in an optical signal, wavelengths corresponds to a particular optical channel.

FIG. 5b is a graph of four exemplary bands of wavelength in an optical signal, wherein each band of wavelengths corresponds to a particular optical channel. The optical signal may contain a first channel of wavelengths 532, a second channel of wavelengths 534, a third channel of wavelengths 536, and a fourth channel of wavelengths 538. The third channel of wavelengths 536 may have a higher signal strength than the other three channels 532, 534, 538.

As noted above, an entire reflected band of wavelengths corresponding to an optical channel of information may be removed from the optical signal. Also, if the reflected band of wavelengths corresponds to an optical channel of information that possess a signal strength out of proportion with the other channels, then a slight percentage of the reflected band of wavelengths may be removed, via coupling, from the optical signal in order to even out the signal strength of all the channels of information within the optical signal. Thus, the optical signal may be spectrally shaped by selectively removing one or more portions of the optical wavelength spectrum contained in the optical signal. One hundred percent or less of the band of wavelengths may be removed, via coupling, from the optical signal.

Referring to FIG. 5a and FIG. 5b, the first acoustic wave exciter 504 transmits an acoustic wave having a frequency that causes the first fiber Bragg grating 510 to reflect the band of wavelengths corresponding to the third channel of wavelengths 536. The amplitude of the acoustic wave is tuned such that only a small percentage of the third channel of wavelengths 536 is coupled from a first mode, such as the forward propagating core mode, to a second mode such as a cladding mode. A feedback loop (not shown) from the output 540 of the gain flatting module 500 to the first acoustic wave exciter 504 to determine the percentage of the third channel of wavelengths 536 needed to be eliminated to make the signal strength of the third channel equal with the rest of the channels.

Multiple interaction regions, such as the first interaction region 508 and the second interaction region 522 may be cascaded to manipulate multiple channels within the same optical signal. Each interaction region 508, 522 operates on one or more bands of wavelengths in the optical signal.

Various other configurations and implementations exist. For one embodiment, the optical waveguide may be an optical fiber. For one embodiment, the optical waveguide comprises a single mode optical fiber. For one embodiment, the optical waveguide may be a multi-mode fiber. For an alternative embodiment, the Nth order of sideband wavelengths may be used in addition to or instead of the first order of sideband wavelengths. For one embodiment, multiple named components such as fiber Bragg gratings or acoustic wave exciters may exist in an embodiment. For one embodiment, optical components having similar functions to the components described above may exist. For an alternative embodiment, one or more acoustic waves may be transmitted to the same interaction region.

For additional embodiments, most functions performed by electronic hardware components may be duplicated by software emulation. In the forgoing specification, the invention has been described with reference to specific exemplary embodiments thereof. It will, however, be evident that various modifications and changes may be made thereto without departing from the broader spirit and scope of the invention as set fourth in the appended claims. The specification and drawings are, accordingly, to be regarded in an illustration rather then a restrictive sense.

What is claimed is:

1. A method, comprising:
   microbending a fiber Bragg grating located in an optical waveguide having a core offset in respect to the cladding with a transverse acoustic wave;
   reflecting one or more Nth order sidebands of reflection wavelengths with the fiber Bragg grating to couple a band of wavelengths within an
   optical signal from a first mode to a second mode;
   separating the optical signal containing an optical spectrum of wavelengths traveling in a first direction into a forward optical signal and a reflected optical signal;
   spectrally shaping the forward optical signal by selectively removing one or more portions of the optical spectrum contained in the optical signal; and
   transmitting the transverse acoustic wave to spectrally shape the forward optical signal.

2. The method of claim 1, further comprising:
   generating the transverse acoustic wave at a first frequency and a first signal strength; and
   transmitting the transverse acoustic wave to an optical waveguide having an interaction region containing the fiber Bragg grating.

3. The method of claim 1, further comprising:
   separating the optical signal traveling in a first direction into a forward optical signal and a reflected optical signal;
   routing the reflected optical signal into another optical component; and
   transmitting the transverse acoustic wave to route the reflected optical signal.

4. The method of claim 1, wherein the Nth order sidebands of reflection wavelengths comprises a first order sidebands of reflection wavelengths.

5. The method of claim 1, wherein the first mode comprises a core mode.

6. The method of claim 1, wherein the first mode comprises a cladding mode.

7. The method of claim 1, wherein the first mode comprises a polarization mode.

8. The method of claim 1, wherein coupling comprises transitioning energy from a first spatial propagation mode to a second spatial propagation mode.

9. The method of claim 1, wherein microbending comprises approximately simultaneously compressing a first portion of the fiber Bragg grating and straining a second portion of the fiber Bragg grating.

10. A method comprising:
    microbending a fiber Bragg grating located in an optical waveguide having a core offset in respect to the cladding with a transverse acoustic wave;
    reflecting one or more Nth order sidebands of reflection wavelengths with the fiber Bragg grating to couple a band of wavelengths within an optical signal from a first mode to a second mode;
    generating the transverse acoustic wave at a first frequency and a first signal strength; and
    transmitting the transverse acoustic wave to an optical waveguide having an interaction region containing the fiber Bragg grating, wherein wavelength spacing of the Nth order sidebands of reflection wavelengths is proportional to the first frequency of the transverse acoustic wave.

11. A method comprising
    microbending a fiber Bragg grating located in an optical waveguide having a core offset in respect to the cladding with a transverse acoustic wave;
    reflecting one or more Nth order sidebands of reflection wavelengths with the fiber Bragg grating to couple a band of wavelengths within an optical signal from a first mode to a second mode;
    generating the transverse acoustic wave at a first frequency and a first signal strength; and
    transmitting the transverse acoustic wave to an optical waveguide having an interaction region containing the fiber Bragg grating, wherein a percentage of the Nth order sidebands of reflected wavelengths coupled from the first mode to the second mode corresponds to the first signal strength of the acoustic wave.

12. The method of claim 10, wherein the fiber Bragg grating is in the core, the core having a center, and the center of the core is offset in relation to a center of the cladding.

13. The method of claim 10, wherein the optical waveguide comprises an optical fiber.

14. The method of claim 10, wherein the fiber Bragg grating is continuous from a first portion to a second portion.

15. The method of claim 10, wherein the fiber Bragg grating includes a first portion and a second portion, the first portion is discrete from the second portion and an interruption of the fiber Bragg grating exists between the second potion and the first portion.

16. The method of claim 10, wherein an acoustic wave exciter generates the transverse acoustic wave and includes an acoustic wave amplifying member, a signal generator, and an acoustic wave generator.

17. The method of claim 16, wherein the acoustic wave amplifying member comprises an acoustic horn.

18. The method of claim 16, wherein the acoustic wave generator comprises a transducer.

19. The method of claim 13, wherein the optical fiber comprises a single mode optical fiber.

20. The method of claim 10, wherein an acoustical-optical tunable add module performs the method according to claim 10.

21. The method of claim 10, wherein an acoustical-optical tunable drop module performs the method according to claim 10.

22. The method of claim 11, wherein an acoustical-optical tunable gain-flattening module performs the method according to claim 11.

23. The method of claim 16, wherein the acoustic wave exciter is tunable to select an Nth order sidebands of reflected wavelengths in an optical signal.

24. The method of claim 11, further comprising:
    an acoustic wave absorber affixed to the interaction region.

25. The method of claim 24, further comprising:
    a heat sink affixed to the acoustic wave absorber.

26. The method of claim 11, wherein the optical waveguide further comprises a jacket surrounding the core and the cladding and the interaction region comprises a section of the optical waveguide where the jacket is removed.

27. The method of claim 11, wherein the optical waveguide contains a tapered region and the interaction region is located within the tapered region.

28. The method of claim 11, wherein an acoustic wave exciter generates the transverse acoustic wave and comprises one or more acoustic wave exciters cascaded in series along the optical waveguide.

29. An apparatus, comprising:
means for microbending a fiber Bragg grating located in an optical waveguide having a core offset with respect to the cladding with a transverse acoustic wave;
means for reflecting one or more Nth order sidebands of reflection wavelengths with the fiber Bragg grating to couple a band of wavelengths within an optical signal from a first mode to a second mode;
means for separating the optical signal containing an optical spectrum of wavelengths traveling in a first direction into a forward optical signal and a reflected optical signal;
means for spectrally shaping the forward optical signal by selectively removing one or more portions of the optical spectrum contained in the optical signal; and
means for transmitting the transverse acoustic wave to spectrally share the forward optical signal.

30. The apparatus of claim 29, further comprising:
means for generating the transverse acoustic wave at a first frequency and a first signal strength; and
means for transmitting the transverse acoustic wave to an optical waveguide having an interaction region containing the fiber Bragg grating.

31. The apparatus of claim 29, further comprising:
means for separating the optical signal traveling in a first direction into a forward optical signal and a reflected optical signal;
means for routing the reflected optical signal into another optical component; and
means for transmitting the transverse acoustic wave to route the reflected optical signal.

32. A apparatus, comprising:
means for microbending a fiber Bragg grating located in an optical waveguide having a core offset in respect to the cladding with a transverse acoustic wave;
means for reflecting one or more Nth order sidebands of reflection wavelengths with the fiber Bragg grating to couple a band of wavelengths within an optical signal from a first mode to a second mode;
means for generating the transverse acoustic wave at a first frequency and a first signal strength; and
means for transmitting the transverse acoustic wave to an optical waveguide having an interaction region containing the fiber Bragg grating, wherein wavelength spacing of the Nth order sidebands of reflection wavelengths is proportional to the first frequency of the transverse acoustic wave.

33. An apparatus, comprising:
means for microbending a fiber Bragg grating located in an optical waveguide having a core offset in respect to the cladding with a transverse acoustic wave; means for reflecting one or more Nth order sidebands of reflection wavelengths with the fiber Bragg grating to couple a band of wavelengths within an optical signal from a first mode to a second mode;
means for generating the transverse acoustic wave at a first frequency and a first signal strength; and
means for transmitting the transverse acoustic wave to an optical waveguide having an interaction region containing the fiber Bragg grating, wherein a percentage of the Nth sidebroads of reflected wavelengths coupled from the first mode to the second mode corresponds to the first signal strength of the acoustic wave.

* * * * *